United States Patent [19]

Turtschan

[11] Patent Number: 4,987,721
[45] Date of Patent: Jan. 29, 1991

[54] METHOD OF AND APPARATUS FOR THE STERILIZATION OF STACKED PACKAGING ELEMENTS

[75] Inventor: Alfons Turtschan, Schwäbisch Hall, Fed. Rep. of Germany

[73] Assignee: Gasti Verpackungsmaschinen GmbH, Schwabisch Hall, Fed. Rep. of Germany

[21] Appl. No.: 463,040

[22] Filed: Jan. 10, 1990

[30] Foreign Application Priority Data

Jan. 10, 1989 [DE] Fed. Rep. of Germany ....... 3900448

[51] Int. Cl.⁵ .................. B65B 55/24; B65B 65/08; B65H 3/28; A61L 2/00
[52] U.S. Cl. ....................................... 53/167; 53/307; 53/426; 198/665; 221/222; 414/795.6; 414/797.7; 422/303; 422/304
[58] Field of Search ............... 53/89, 90, 97, 101, 53/110, 167, 425, 426, 432, 510, 307; 198/663, 665; 221/221, 222; 422/303, 304; 414/795.6, 797.7

[56] References Cited

U.S. PATENT DOCUMENTS

| 747,296 | 12/1903 | Bowser | 417/63 |
|---|---|---|---|
| 2,375,564 | 5/1945 | Leuck | 536/1.1 |
| 3,323,586 | 6/1967 | Guckel | 422/304 X |
| 3,747,296 | 7/1973 | Zausner | 53/167 |
| 3,766,709 | 10/1973 | Zausner | 53/167 |
| 3,783,581 | 1/1974 | Pierce | 53/167 X |
| 3,859,774 | 1/1975 | Bausch | 53/167 |
| 4,296,068 | 10/1981 | Hoshino | 53/167 X |
| 4,622,800 | 11/1986 | Turtschan | 53/167 X |

FOREIGN PATENT DOCUMENTS

| 0334216 | 9/1989 | European Pat. Off. | 53/426 |
|---|---|---|---|
| 1105788 | 4/1961 | Fed. Rep. of Germany . | |
| 2411142 | 10/1975 | Fed. Rep. of Germany . | |
| 2310661 | 5/1979 | Fed. Rep. of Germany . | |
| 0735539 | 5/1980 | U.S.S.R. | 221/222 |
| 1586858 | 3/1981 | United Kingdom . | |
| 2177923 | 2/1987 | United Kingdom . | |

Primary Examiner—Robert L. Spruill
Assistant Examiner—Beth Bianca
Attorney, Agent, or Firm—Herbert Dubno

[57] ABSTRACT

Cups or lids for packaging foodstuffs and the like in a sterile environment are sterilized in the packaging machine by passing them through a sterilizing chamber to be contacted first by the hydrogen peroxide and then by hot air. The packaging elements are initially moved apart rapidly and are than brought toward one another without contact, periodically in the sterilizing chamber to improve the contact of the sterilizing and drying fluid with the surfaces.

17 Claims, 18 Drawing Sheets

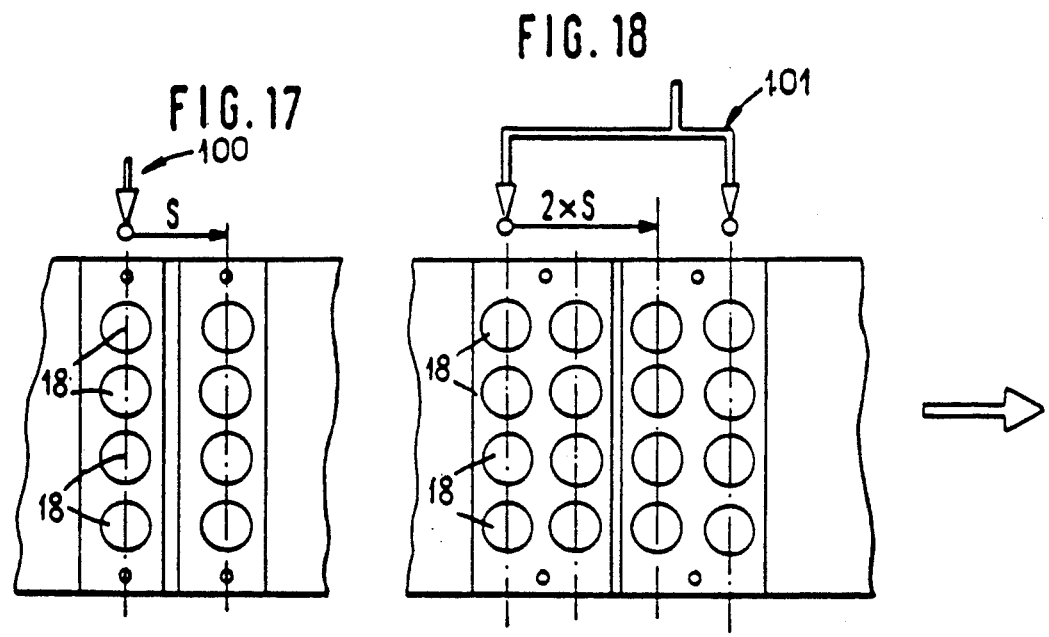
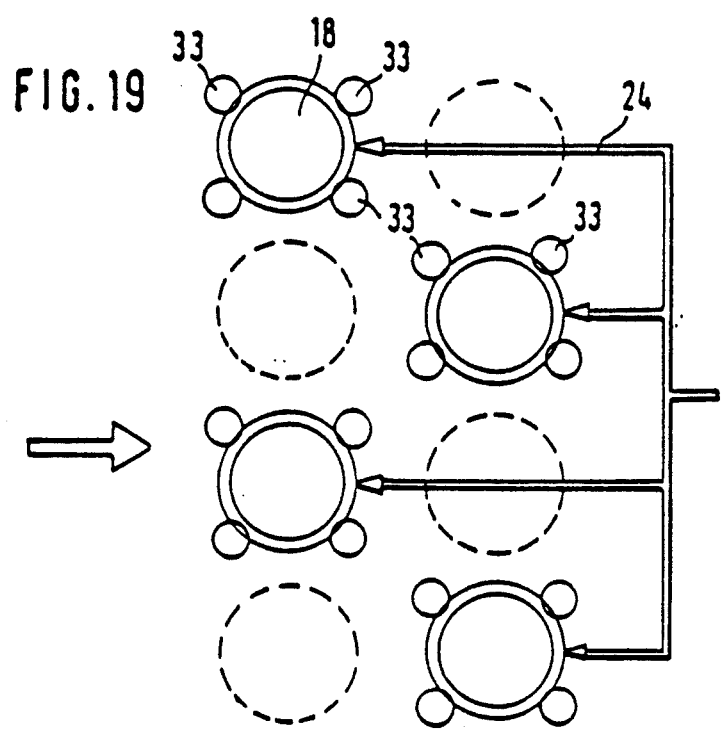

METHOD OF AND APPARATUS FOR THE STERILIZATION OF STACKED PACKAGING ELEMENTS

FIELD OF THE INVENTION

My present invention relates to a method of and an apparatus for the sterilization of stacked packaging elements, especially cup elements and lid elements, for use in conjunction with a packaging machine of the type in which the cup elements are filled with a substance to be packaged under sterile conditions, for example, a foodstuff or medicament, and the packages are completed by the application of the lid elements to the cup elements.

More particularly, the invention relates to a method of sterilizing in such a system and the sterilizing apparatus of such a machine wherein the sterilization is effected with a fluid medium, e.g. an $H_2O_2$ vapor mixture or spray followed by hot sterile air which drives off all traces of the sterilizing hydrogen peroxide.

BACKGROUND OF THE INVENTION

It is known to sterilize packaging elements of the aforedescribed type in conjunction with the packaging of foodstuffs and the like, by passing the packaging elements in spaced relation through a sterilizing chamber and contacting them with hydrogen peroxide in a vapor state.

Referring herein to hydrogen peroxide vapor will be understood to include a hydrogen peroxide spray in which the hydrogen peroxide is in an aerosol or fine-droplet form with the droplets being in suspension in a carrier gas.

Sterilization of this type is described, for example, in German open application DE-OS No. 23 10 661.

In the preferred construction of this system, the stacked receptacles are displaced by a horizontally-moving belt conveyor from an inlet into the sterilizing chamber individually. A chain conveyor displaces the receptacles in a horizontal direction through the sterilizing chamber and a drying chamber downstream thereof to the filling and package-closing machine.

During the advance of the individual receptacles through the sterilizing and drying chambers, the stacked receptacles are engaged at their edges by grippers and are maintained at a constant distance or spacing from one another. The grippers are provided on the chain conveyor which is disposed beneath the receptacle stack.

The gripper devices of this system are formed with recesses transverse to the displacement direction and are in such manner that each gripper engages an edge of a respective receptacle and thus can transport it in the direction of movement of the conveyor.

Because of the one-sided engagement by the gripper devices with the edges of the receptacles, it is possible for the receptacles which are separated from one another to tilt or cant so that a part of one receptacle will contact a portion of a subsequent or preceding receptacle and uniform sterilization cannot be guaranteed because of such contact.

In a highly general way, it is state of the art also to allow receptacles to pass through a sterilizing chamber in a vertical direction. In these state of the art systems, however, the receptacle is open downwardly and it is likewise not possible to prevent, with such earlier systems, the partially separated receptacles of the stack from tilting or canting during their movement so that a part of one receptacle can come into contact with a part of another receptacle and again prevent uniform and complete sterilization.

Consequently, whether or not the receptacles are moved in the horizontal direction or in the vertical direction through the sterilizing chamber, there is the aforementioned disadvantage of the possibility of contact with interference with effective sterilization.

These systems also have other drawbacks.

For example, the conveyors will usually have one end extending into the sterilizing chamber and another end continuously outside the sterilizing chamber and creating a danger of reinfection.

A chain conveyor within the sterilizing chamber, moreover, in constant contact with the hydrogen peroxide and within the drying chamber in constant contact with hot air suffers a relatively significant temperature loading which can result in length changes in the conveyor chain and breakdown or the need for substantial maintenance. Indeed length changes may interfere with the ability of a transfer device downstream of the drying chamber to synchronize with the chain and transfer the packaging elements to the conveyor of the package filling and closing machine.

Generally also, a chain conveyor must be lubricated with a sterile lubricant and such lubricants tend to break down in the presence of hydrogen peroxide.

Mention can also be made of a receptacle-displacing system which utilizes conveyor screws and, specifically, three horizontally-arranged conveyor screws disposed equidistantly about the receptacles. The synchronously-rotated conveyor screws displace the receptacles with a constant spacing between them in a horizontal direction through the sterilizing and drying chambers.

Apart from the systems described which sterilize the packaging elements externally of the filling and package-closing machine, there are package-filling and closing machines which have the packaging-material sterilization integrated therein.

In these sterilizing systems utilizing hydrogen peroxide, the cups on a horizontally circulating conveyor belt are subjected to treatment with the $H_2O_2$ vapor along their inner surfaces in sterilizing and drying chambers integrated into the machine along the transport path.

The $H_2O_2$ vapor deposit has a fine condensate film on the inner wall of the receptacle so that fine, uniform wetting of the surface without droplet formation can be achieved. In a plurality of further stations downstream of the peroxide treatment station, the cups or receptacles are dried with hot air. The residual peroxide vapor in the exhaust hot air is drawn away by a blower.

The sterilized cups pass from the sterilizing chamber via specially constructed guide plates which also close off the sterilizing chamber and pass into the highly sterile compartment beneath the metering station at which the substance to be packaged is fed in unit doses or quantities into the sterile cups.

The lids for the cups are sterilized in a second sterilization chamber in accordance with the same principles.

With such integrated packaging-machine sterilization, the aforedescribed problems with $H_2O_2$ loading and temperature loading of the transport chain are especially pronounced. In addition, since the sterilization and drying take place while the cups are moving horizontally and the sterilization chamber and drying chambers must be located horizontally along the conveyor, the overall length of the integrated packaging and sterilization machine and especially the part thereof upstream from the filling station may be intolerable because of spacial requirements.

OBJECTS OF THE INVENTION

It is the principal object of the present invention to provide an improved method of sterilizing packaging elements such as the cups and lids of a filling and packaging machine of the type described, whereby the aforementioned drawbacks are avoided.

Another object of the invention is to provide an improved method of sterilizing such elements which will ensure an improved, full-service uniform sterilization of such packaging elements.

It is also an object of this invention to provide an improved apparatus for the sterilization of packaging elements such as the cups and lids of a food-packaging or medicament-packaging machine which has the sterilization facilities integrated into the machine but wherein the machine has a limited length and a more compact configuration.

Still another object of my invention is to provide an improved apparatus for the packaging of foodstuffs, medicaments and other sterile substances which ensures improved sterilization and is free from the disadvantages of earlier packaging machines.

SUMMARY OF THE INVENTION

These objects and others which will become apparent hereinafter are attained, in accordance with the invention by a method in which the packaging elements, namely, the lid elements or cup elements, while being contacted with the sterilizing fluid, generally hydrogen peroxide vapor followed by sterile hot air, are periodically accelerated toward one another and apart at least once while within the sterilizing chamber and while they are held in all-around spaced relationship from preceding and succeeding elements so that even when the packaging elements are moved together, they remain out of contact.

I have found that this type of operation, wherein the packaging elements are held in a well-defined manner during their movement through the sterilizing chamber and are moved together and apart as they are displaced along the chamber in a periodic manner, causes a pumping action between successive packaging elements, thereby improving the passage of the fluid between them and onto and along the respective surfaces.

For example, in the case of cup elements, wherein the cups partly are received in one another while being spaced apart, an inner cup forms a piston displacing the fluid within the cylinder formed by the outer cup, thereby pumping the fluid in and out of the outer cup along the inner cup.

A similar pumping action applies when lid elements are provided.

The rapid separation of the successive elements results in a temporary pressure reduction which causes volatilization of any hydrogen peroxide which is not in a vapor state and ensures a uniform and rapid distribution of the sterilizing agent on the surfaces.

In other words, the pumping action ensures that the external surfaces of any following cup and the inner surfaces of the immediately preceding cup will be forceably contacted with the sterilizing agent and dead stops within the cups will be precluded.

I have found, quite surprisingly, for a given sterilization in an integrated system, this pumping action allows a substantially smaller quantity of $H_2O_2$ to be used. Investigations have indicated that savings of up to 85% in the amount of $H_2O_2$ used can be obtained.

The pumping action has also found to be effective for the contact of the hot air with the cups during the drying of the latter. Indeed, the cups are more rapidly dried than heretofore without allowing them to contact one another since the hot air is forced along the inner and outer walls of the packaging elements. Any hydrogen peroxide which may have been deposited is more rapidly removed. Tests have shown that both sterilization effectiveness is increased and removal of the sterilizing agent is expedited in an optimal manner. The degree of sterilization obtained is similar to that of a packaging material which has been immersed in a sterilizing-agent bath.

It has been found to be advantageous to effect this pulse-like movement of the packaging elements a number of times in the sterilizing chamber so that the stack of elements appears to have an accordian-like motion in passing through the chamber.

By providing a corresponding number of inlets for inlets of appropriate dimensions, the hydrogen peroxide mixture can be brought into contact with the surfaces a number of times and any desired degree of sterilization can be reached over all of the surfaces of the packaging material.

The method, more particularly, can comprise the steps of:

(a) providing a stack of the packaging elements with successive elements of the stack in mutual contact;

(b) advancing the elements of the stack in succession through a sterilizing chamber while mutually spacing successive ones of the elements apart;

(c) contacting the elements of the stack as they are advanced through the sterilizing chamber with a sterilizing fluid which passes around and between the elements and through spaces between the elements as the elements are advanced through the sterilizing chamber;

(d) during advancing of the elements through the sterilizing chamber and while the elements are contacted with the sterilizing fluid, periodically accelerating successive elements apart from one another at least once while the elements are in the chamber; and (e) following acceleration of successive elements apart from one another in step (d), rapidly bringing successive elements toward one another while maintaining the successive elements apart and without contact between them to effect a pumping action on the sterilizing fluid intensifying contact of the fluid with the elements.

The apparatus for carrying out the method of the invention can comprise:

means for displacing a succession of cup packaging elements along a path;

filling means along the path for introducing a filling substance into the cup elements;

means along the path for applying lid packaging elements to the cup elements for closing the cup elements containing the substance and forming closed packages with the cup elements; and means along the path for sterilizing at least one of the cup elements and the lid elements, the means for sterilizing including:

a vertically disposed sterilizing chamber disposed along the path and individual to a respective a stack of the packaging elements having successive elements of the respective stack in mutual contact, means in the chamber for advancing the elements of the stack in succession through the sterilizing chamber while mutually spacing successive ones of the elements apart, means for contacting the elements of the stack as they are advanced through the sterilizing chamber with a sterilizing fluid which passes around and between the elements and through spaces between the elements as the elements are advanced through the sterilizing chamber, and means, during advancing of the elements through the sterilizing chamber and while the elements are contacted with the sterilizing fluid, for periodically accelerating successive elements of the stack apart from one another at least once while the elements are in the chamber and, following acceleration of successive elements apart from one another, rapidly bringing successive elements toward one another while maintaining the successive elements apart and without contact between them to effect a pumping action on the sterilizing fluid intensifying contact of the fluid with the elements.

The apparatus, therefore, is a package-filling and closing machine having integrated therein at least one substantially vertical sterilization chamber which is assigned to the particular stack and thus is separate from other sterilization chambers and is traversed from top to bottom by the packaging elements, i.e. either the lids or the cups, to be sterilized therein.

The sterilization chamber has an upper inlet opening and a lower outlet opening for the stacked packaging elements, as well as an inlet for a sterilizing agent vapor mixture and means for passing hot air through the chamber. The chamber is provided with conveying means for the form of at least one substantially vertical conveyor worm for advancing the packaging elements through the sterilizing chamber and formed along its length with a variable-pitch thread which, upon rotation of the conveyor screw at constant speed, will accelerate the packaging element apart and then together during their passage through the chamber.

The pitch of the screw thus is so selected that the desired pumping or ventilating action within the stack is obtained.

The vertical arrangement of the conveyor screw allows integration of the packaging sterilization means with the filling and closing machine over a comparatively short length of the cup transporter. Sterilization is thus effected with particularly simple means occupying relatively little space. Thus apart form the aforementioned saving of $H_2O_2$ and increased efficiency of sterilization, there may be a reduced consumption of electrical energy and hot air. As a consequence, the apparatus of the invention can be considered more efficient than prior art systems from an energetic viewpoint as well.

German patent document DE-OS No. 21 05 788 discloses a fully automatic package-closing machine which is provided with means for removing the covers from a stack thereof, with this removing device comprising three worms each rotatable about a respective vertical axis and having threads engaging the edge of the cover and displacing same.

In this system the thread of the worm has an increasing pitch from the inlet end to its outlet end. Comparatively large separating forces are reached and are slowly transferred to the cover lid edges. The comparatively small pitch ensures that the cover unit be tilted and that additional stresses will not apply to the cover. This system, of course, does not give rise to a periodic acceleration of the covers away from and toward one another with the pumping action achieved with the present invention.

Advantageously, one or more pairs of such conveyor screws are provided in accordance with the invention, the screws of each pair being located diametrically opposite one another. A synchronous drive for the screws has been found to be advantageous as well.

For the invention it is important, furthermore, that the inlet for the $H_2O_2$ vapor mixture be proximal to the upper end of the sterilization chamber while the inlet for the sterile hot air communicate with a distribution chamber communicating with the sterilization chamber over substantially the entire height thereof.

The connection between the sterilization chamber and the distribution chamber is effected by a multiplicity of throughgoing bores in the walls of the sterilization chamber which preferably are inclined inwardly and downwardly. This construction ensures that the hot air will be effectively applied to the inner and outer walls of the packaging elements.

In many cases, the lid of the packaging material may be composed of aluminum foil or the like. In this case, upstream of the sterilizing chamber a cover transfer device is provided while a further means is provided downstream of the sterilizing chamber for displacing the lids from the sterilizing chamber onto the cups on the conveyor of the packaging machine.

The cover transfer device advantageously is provided with an embossing stamp which can emboss corrugations in the aluminum or aluminum foil cover. The corrugations impart to the lid intrinsic stabilities like those of plastic lids which may be molded or otherwise shaped to have recesses of various constructions.

The threads of the conveyor screws can be formed by ribs with rounded beads or terminal edges. Planar aluminum lids can be displaced by other means without particular difficulty.

The sterilization effect is not negatively influenced at all by this type of engagement of the lids since the rounded beads at the distal edge of the thread is only in point contact with the lids.

It has been found to be especially advantageous, in accordance with the invention, to provide the sterilizing chamber in a duplex construction, i.e. in the form of two such chambers which are spaced apart and means is provided between the two chambers for introducing the sterile air into the sterilization chamber. The requirement for the least amount of spread of the apparatus is thus readily satisfied by this construction.

Of course, a multiplicity of sterilizing chambers with respective conveyor systems can be used for the treatment of the packaging element in stack form in a multiplicity of parallel rows, the packaging rows being used either simultaneously for sterilization or for sterilization of the packaging elements in staggered relationship. The sterilizing chambers in the parallel rows can be offset from one another if desired.

BRIEF DESCRIPTION OF THE DRAWING

The above and other objects, features and advantages of the present invention will become more readily apparent from the following description, reference being made to the accompanying drawing in which:

FIG. 17 is a diagram illustrating a portion of the sterilizing device;

FIG. 18 is a view similar to the diagram of FIG. 17 but showing the parts thereof doubled;

FIG. 19 is a schematic plan view of an arrangement having offset devices;

SPECIFIC DESCRIPTION

Figure 20:
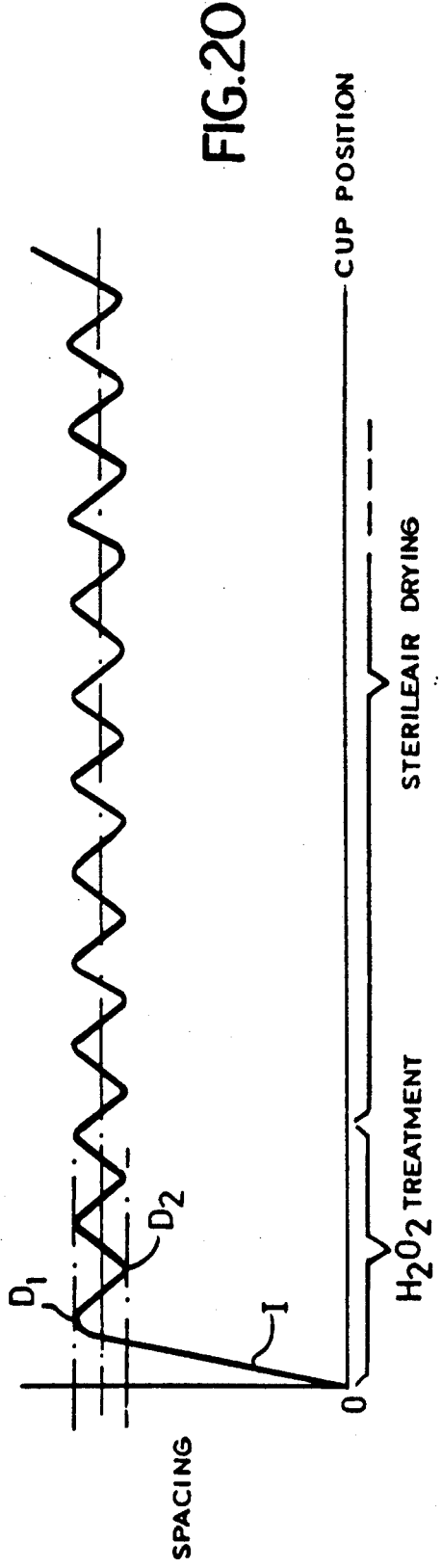
FIG. 20 is a graph in which the spacing of the cup or lid elements from one another has been plotted along the ordinate against the cup position in travel along the abscissa and illustrating the periodic pattern of movements of the lids or cups.
Figure 21:
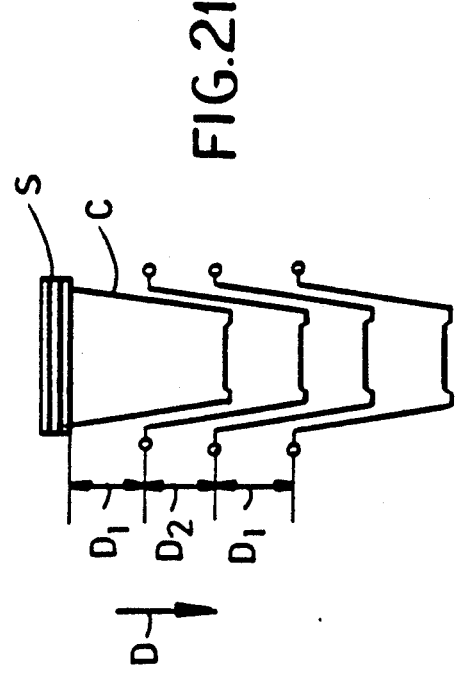
FIG. 21 is a diagram serving to illustrate a portion of FIG. 20.

Referring first to FIGS. 20 and 21, in which the principles of the present invention are illustrated, it can be seen that a stack S of cups C are provided with lids and filled in the packaging machine described hereinafter, are provided at the top of a sterilizing chamber which has not here been illustrated. The conveying means within the chamber is so constructed and renamed that each cup is initially separated from the stack and thus has a spacing $D_1$ therefrom as it is advanced downwardly in a direction of displacement D. During this continuous advance, the cup is periodically accelerated and retarded so that at certain points the cup becomes closer to the next cup (distance $D_2$) and further from the next cup $D_1$.

The periodicity of this is displayed in the graph of FIG. 20 in which the abscissa plots position along the path D or distance therealong from the origin O and the ordinate plots cup spacing.

It can be seen in the hypothetical case illustrated in FIG. 20 that a cup is initially brought to the distance $D_1$ from a zero spacing condition in which it is in contact with the remainder of the stack and then is alternately accelerated and retarded so that the spacing periodically varies between $D_1$ and $D_2$ until at the end of the sterilization chamber the cup is removed from the chamber for deposit upon the packaging conveyor.

The periodic motion gives rise to the pumping action whereby each inner cup constitutes a piston or ram displacing the sterilizing fluid vigorously within each outer cup.

Figure 1:
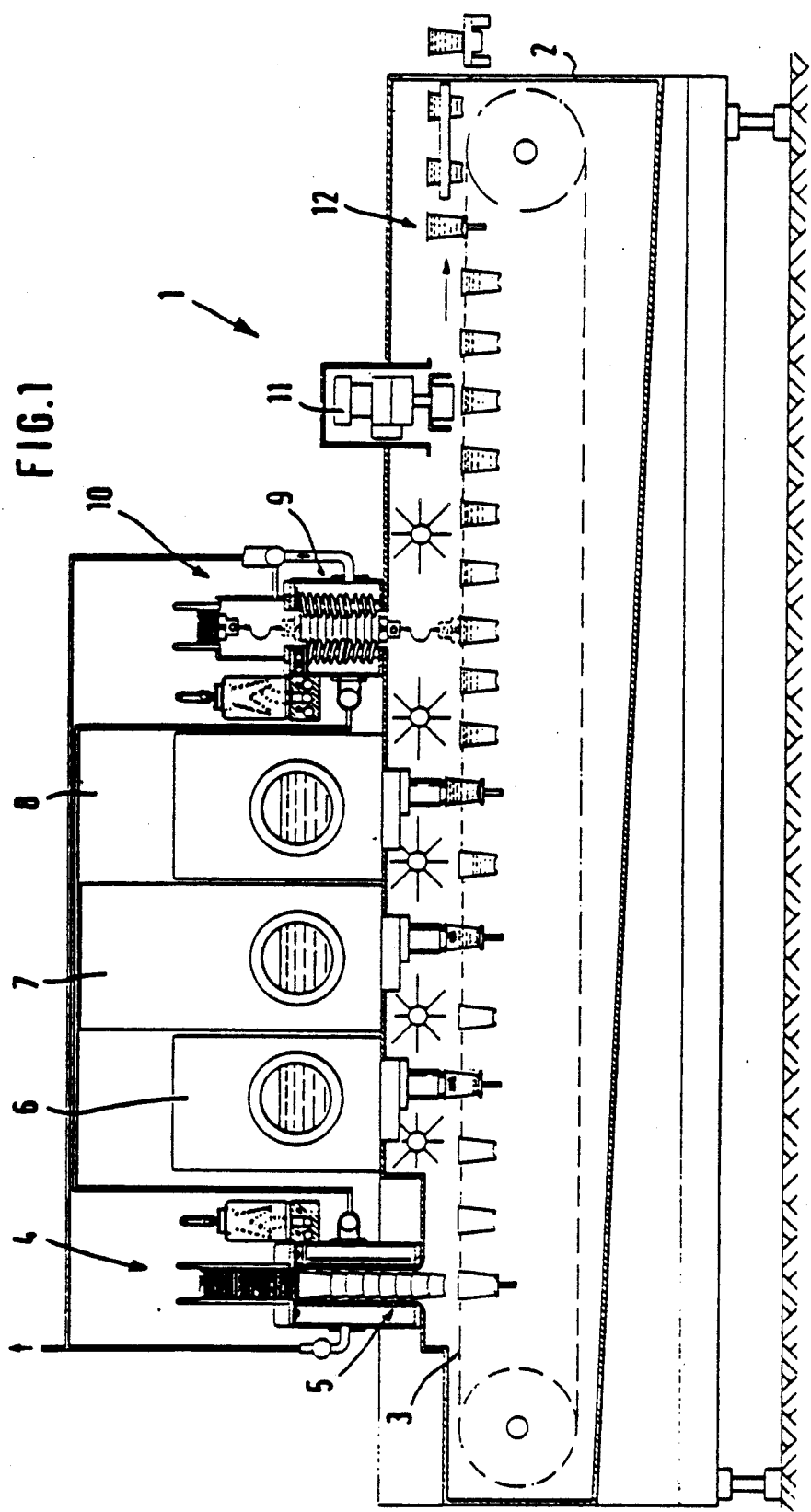
FIG. 1 is a diagrammatic vertical section through a package filling and closing machine provided with a sterilizing device for the cup elements and a sterilizing device for the cover elements in accordance with the invention.

Referring now to FIGS. 1-19, wherein various embodiments of sterilizing chambers have been illustrated and the association of the sterilizing chambers with the remainder of the packaging machine is shown, it can be seen that FIG. 1 shows a package-filling and closing machine 1 for the packaging of a sterilized substance in germfree packaging under aseptic conditions.

The substance to be filled in the package can be any liquid or pasty comestible, for example, such as milk, yogurt, sour cream, soup or the like.

The packaging may be constituted by prefabricated cups of plastic, aluminum or composite materials. It is important that the cup have such form and stability that it can withstand the sterilization requirements, especially the sterilization temperature.

The cups are closed by plastic lids or aluminum flat lids of embossed foil which can be coated on one side with a heat-sealing lacquer to enable the lids to be heat-sealed to the cup at an appropriate station of the machine. Combination closures utilizing additional cover members which can plug into the mouth of the cup or can engage over the rim of the cup can be used in addition or alternatively.

Referring again to FIG. 1, it can be seen that the machine comprises a housing 2 which can be maintained under a superatmospheric pressure with sterile air and is provided with a packaging conveyor in the form of an endless transport chain 3.

The package-filling and closing machine also comprises a cup destacker and feed station 4, provided with a cup-sterilizing unit 5. A plurality of filling stations 6, 7 and 8 can be provided.

Downstream of the last filling station, along the path of the cups defined by the conveyor 3, a lid-application station 10 is provided. The lid-application station is connected with a lid-sterilizing unit 9. Downstream of the latter, is a heat-sealing station 11 and this is followed by a cup-lifting and transfer station 12.

Figure 2:
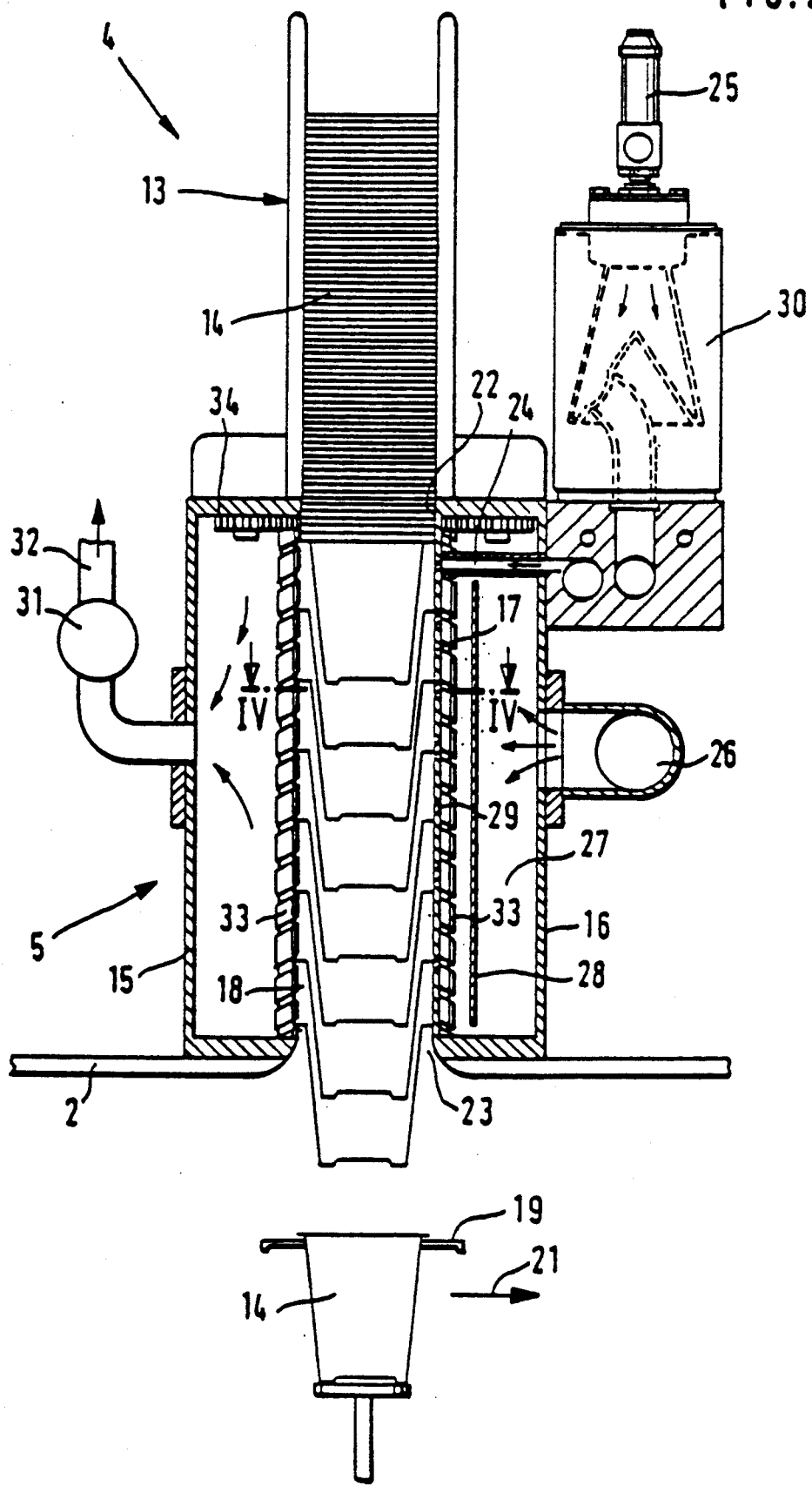
FIG. 2 is a vertical section of the sterilizing device for the cup elements drawn to a larger scale.

The cup destacking and feeding station together with its associated cup sterilization unit has been illustrated in greater detail in FIG. 2. The cup destacking and feed station 4 comprises a stacking magazine 13 which opens downwardly directly into the sterilizing chamber and can feed the cups 14, which are in contact with one another in the magazine, downwardly. Within the magazine the cups are positioned with their mouths open upwardly.

In an extension of the stack magazine 13, which can be defined by spaced-apart rods, a housing 15 is provided which has an outer wall 16 and an inner wall 17 spaced from that outer wall.

The inner wall 17 defines a sterilizing chamber 18 individual to the particular stack and traversed by the cups 14 in a manner described in greater detail below.

After the cups 14 pass through this sterilizing chamber, they may be engaged by grippers or suction elements not shown and suspended in cell sheets 19 of the chain conveyor 3. The chain conveyor can then displace the individual upwardly-open cups positioned thereon in the direction of arrow 21.

The sterilizing chamber has an inlet opening 22 for receiving the cups and an outlet opening 23 through which the sterilized cups are discharged.

The sterilizing chamber 18 has an inlet 24 for a sterilizing agent, for example, a $H_2O_2$ vapor mixture, which is supplied from a two-opening nozzle 25 and a heating chamber 30 in which the $H_2O_2$ is vaporized.

The two components fed by the nozzle 25 may be the hydrogen peroxide and the carrier gas.

In the manner described hereinafter, a hydrogen peroxide vapor mixture is directed against the cups and forms a condensate film thereon. The subsequent drying of the cups is effected with sterilizing hot air supplied by an inlet 26.

The inlet 26 communicates with a distribution chamber 27 provided with a baffle plate 28 intended to ensure a uniform distribution of the hot air over the height of the distribution chamber and thus the sterilization chamber.

The sterile hot air is directed from the distribution chamber 27 via downwardly and inwardly directed throughgoing bores 29 into the sterilizing chamber 18.

The hot air dissociates the hydrogen peroxide into atmospheric oxygen and water. Residual peroxide in a vapor state is drawn out of the sterilization chamber by suction via the suction pump 31 and the discharge pipe 32 to a catalyst which competes the destruction of the $H_2O_2$ before the evacuated gases are discharged into the atmosphere.

Figure 4:
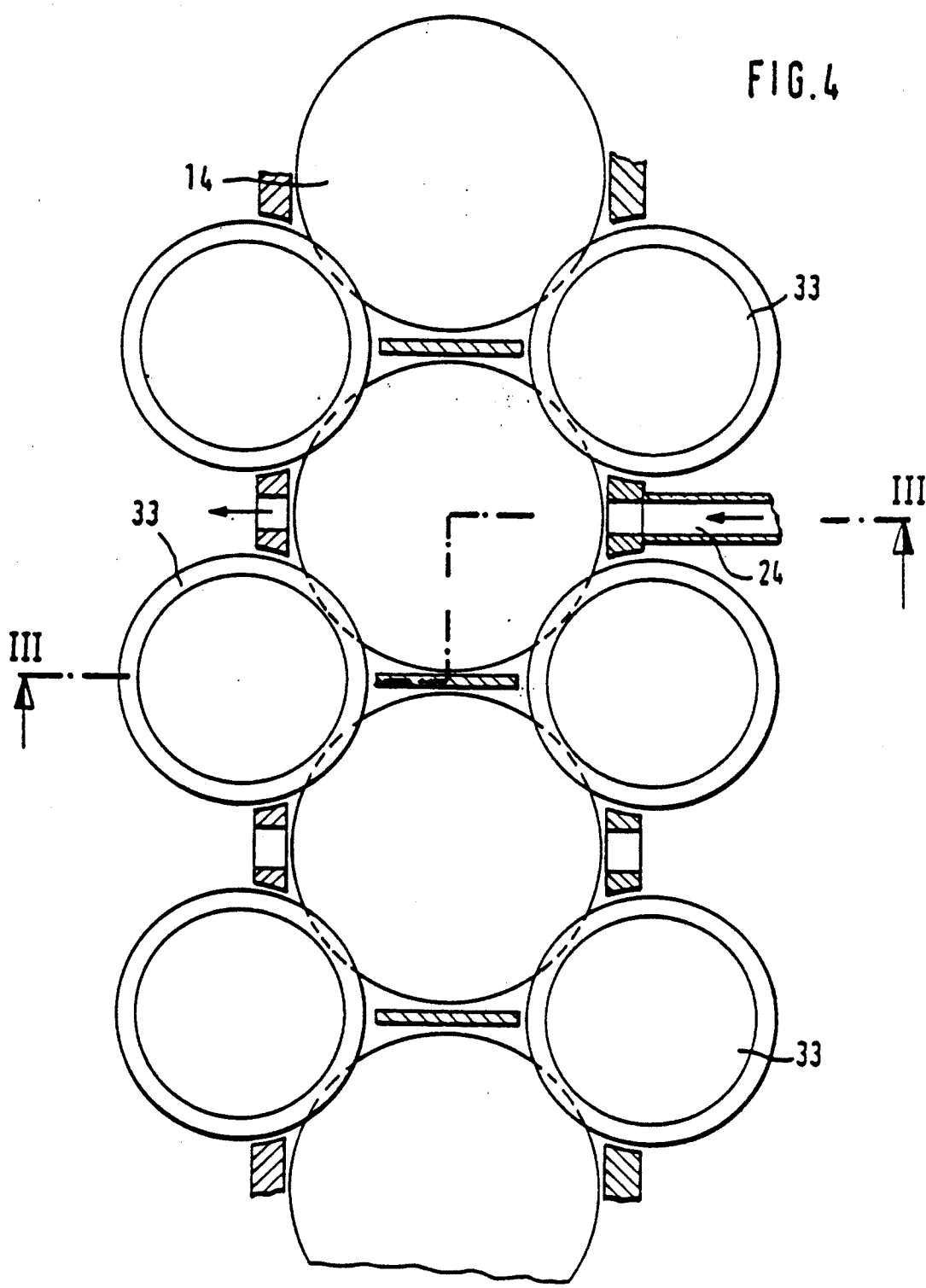
FIG. 4 is a diagrammatic plan view, partly in sectional form, taken generally along the line IV—IV of FIG. 2.

While FIG. 2 shows only one sterilizing chamber, it will be understood that a plurality of such chambers can be disposed one behind the other, for example, as has been illustrated in FIG. 4.

From FIGS. 1-4, moreover, it will be apparent that each sterilizing chamber 18 has at least one pair of diametrically opposite conveyor screws 33 extending substantially the full length of the sterilizing chamber.

These conveyor screws are formed over their length with means defining a fully determinate path for the cup elements (or lid elements) engaged thereby and this means may be constituted by a thread positioned to engage the rim of a cup in the groove of the thread to accelerate the cups away from one another rapidly as the cups enter the sterilizing chamber and so that between the inner wall of an accelerated cup and the outer wall of the next cup, a pressure reduction is effected which ensures a good and uniform distribution of the $H_2O_2$ vapor mixture over these walls.

Thereafter, spacing between successive cups is again reduced so that the resulting plunger action, coupled with the introduction of hot sterile air via the bores 29 will sweep the condensate film over the surfaces and effect a distribution of the film uniformly over these surfaces. The pumping action is repeated by separation of the cups and movement of them toward one another periodically within the chamber to increase the contact of the hot air wit the condensate film and the removal of the hydrogen peroxide from the cups.

The variable pitch of the thread of the screws ensures this periodic motion with displacement of the screws 33 at a constant speed. The belt drive for the screws 3 via their drive pulleys 34 will be developed in greater detail below.

Figure 3:
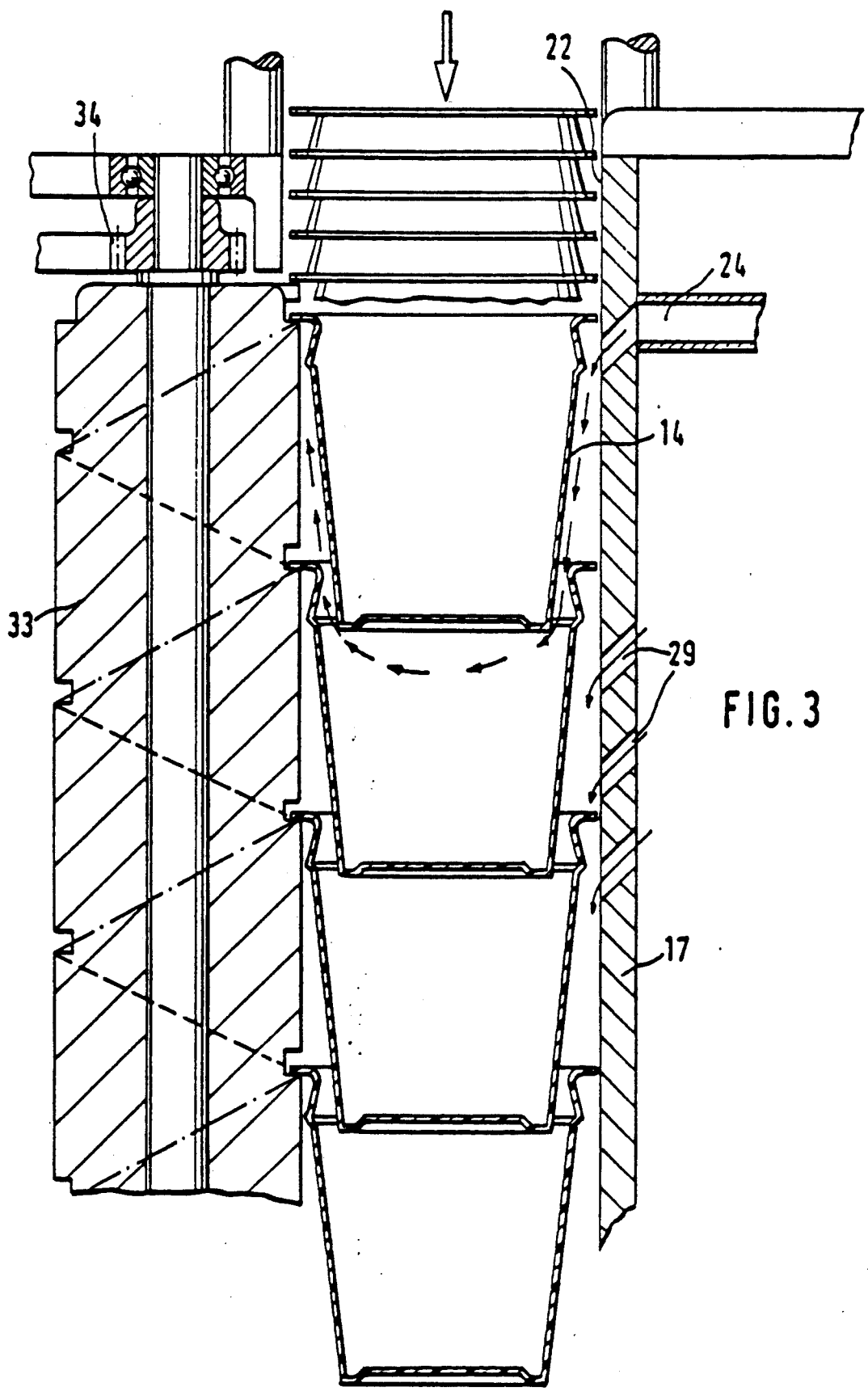
FIG. 3 is a detail section enlarged still further of the cup sterilization device and seen in a section along the line III—III of FIG. 4.

Journalling of the screws as well as the flow paths of the hydrogen peroxide vapor mixture and the sterile air are more readily apparent in FIG. 3.

Figure 5:
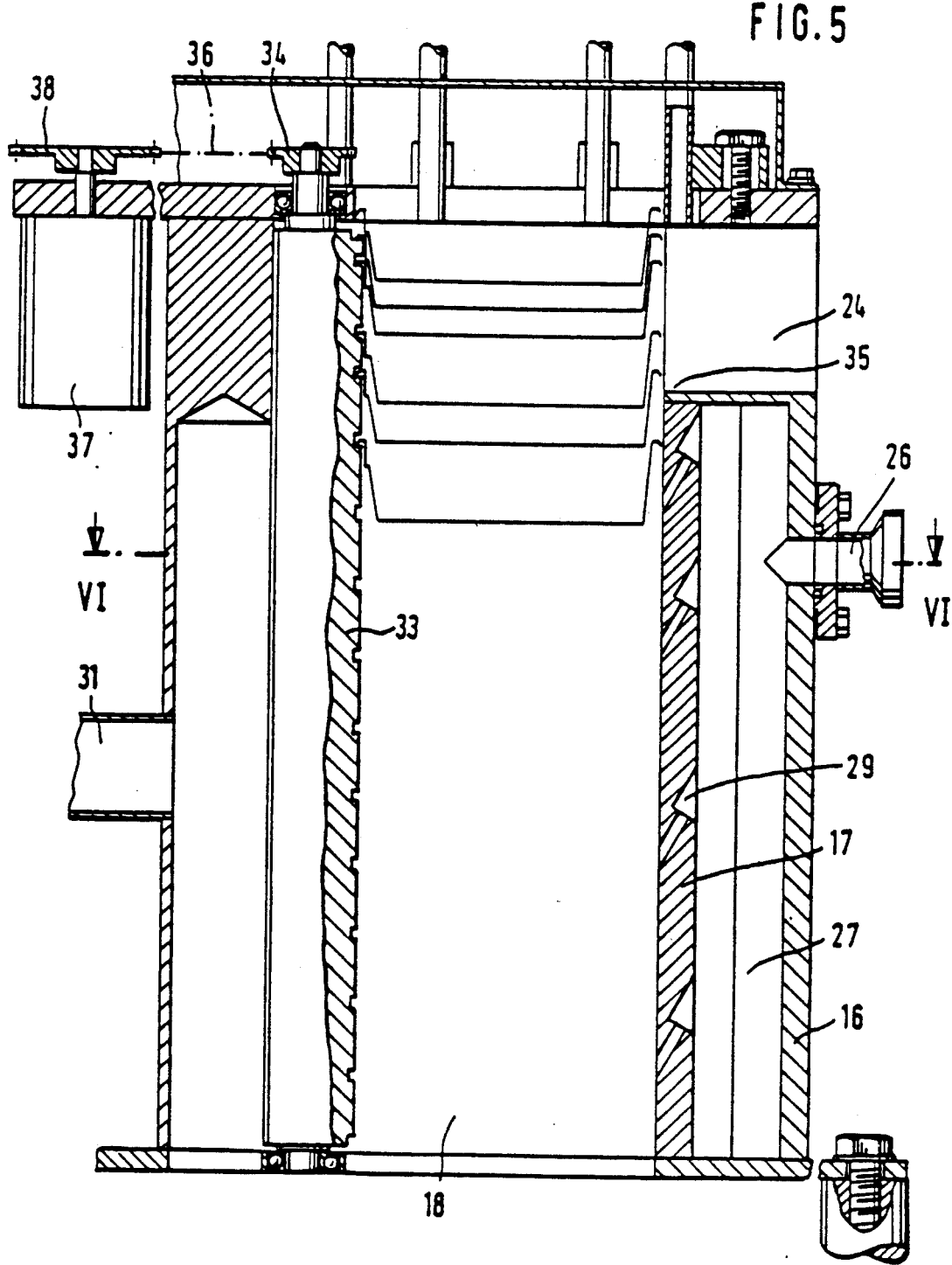
FIG. 5 is a sectional view of a modification of the cup sterilization device taken along line V—V of FIG. 6.
Figure 6:
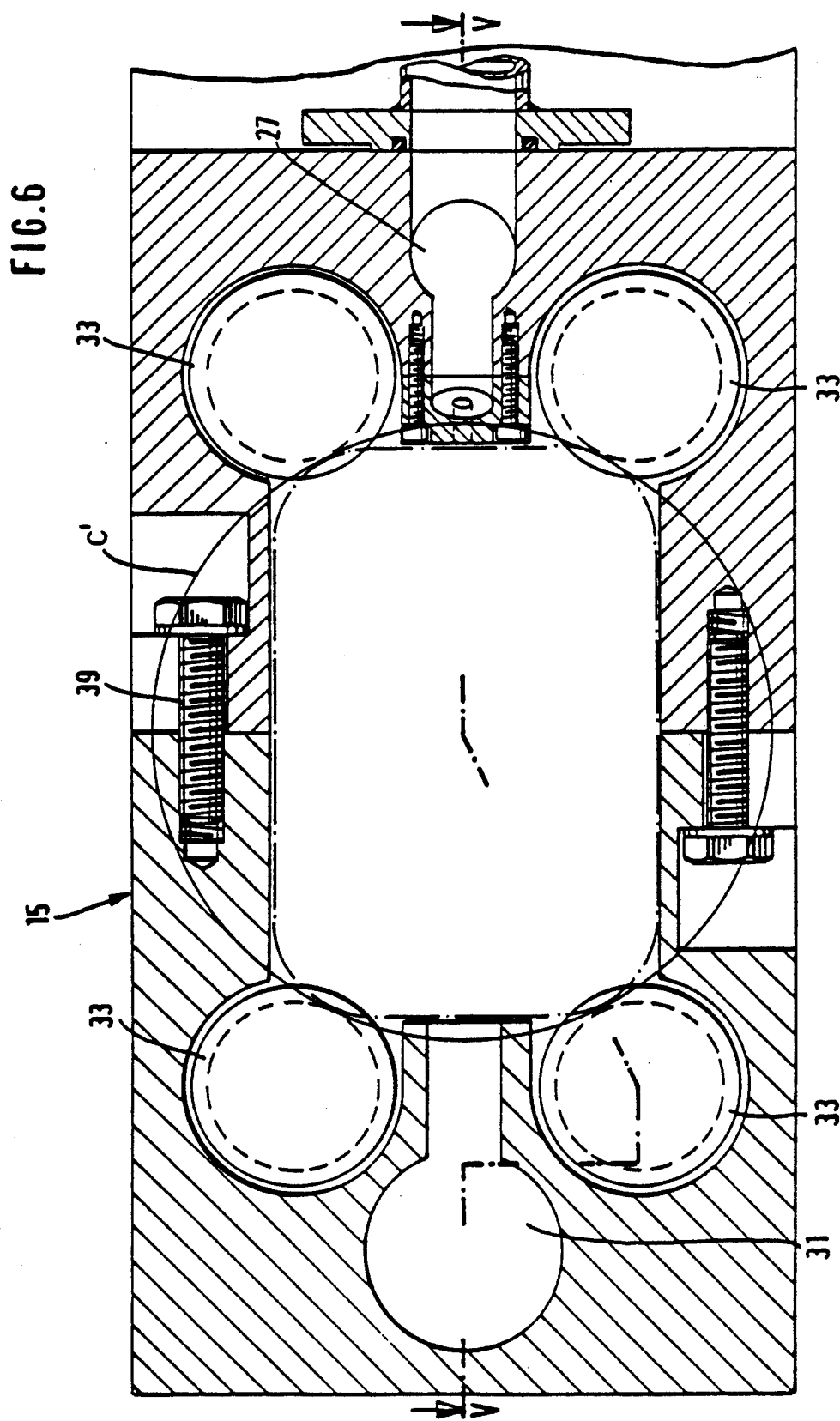
FIG. 6 is a sectional view taken along the line VI—VI of FIG. 5.
Figure 7:
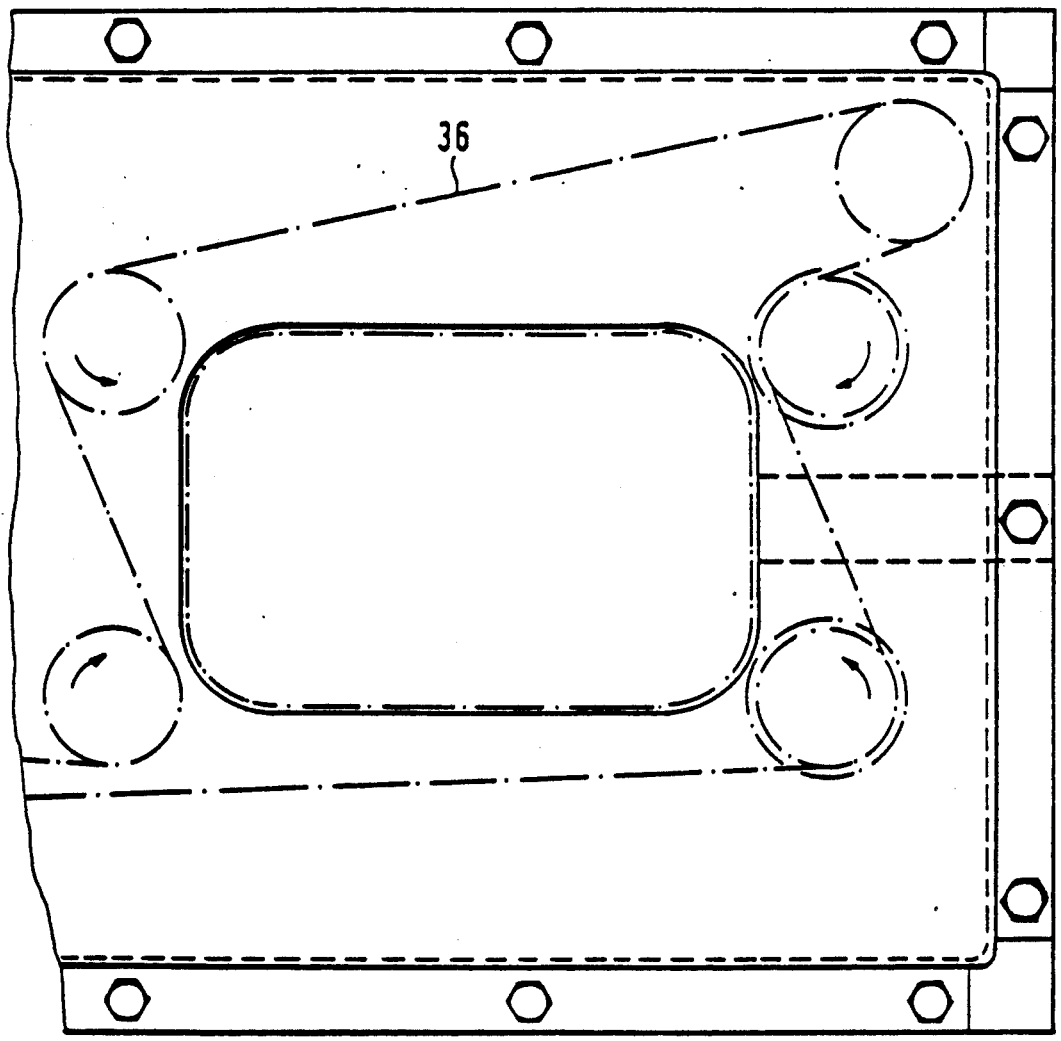
FIG. 7 is a plan view showing the drive of the worm of the conveyor screws.

In the embodiment of FIGS. 5-7, it can be seen that sterilization can be effected on cups with a less conical and more rectangular cross section. In this embodiment, cups have somewhat rounded corners as well.

From FIG. 5 it will be apparent that the receptacles are moved apart to a comparatively large distance immediately prior to their admission into the sterilizing chamber 18. In this position, the hydrogen peroxide vapor mixture is introduced into the cups. The cups are then moved together, without coming into contact with one another and then once again apart so that at location 35 they are again subjected a second time to the hydrogen peroxide vapor mixture. The receptacles are then moved relatively to smaller spacing apart without contact and finally are subjected to the sterile hot air supplied through the bores 29.

For simplification of illustration, in FIG. 5 only, a part of the left-hand worm 33 and its drive pulley 34 has been shown in detail.

The drive pulleys are engaged by a belt 36 which, in turn, is driven by the motor 37 and a driving pulley 38. The synchronous drive for the conveyor screws has been shown in FIG. 7.

FIG. 6 shows in dot-dash lines a rectangular container with rounded corners. A circle C' in FIG. 6 shows that, in a corresponding configuration of the housing, circular containers can also be sterilized. For practical reasons the housing 15 is here divided into separate parts which are detachably connected to one another by screws 39.

FIGS. 8-13 show a cover application station 10 with the cover or lid sterilization unit 9.

Figure 8:
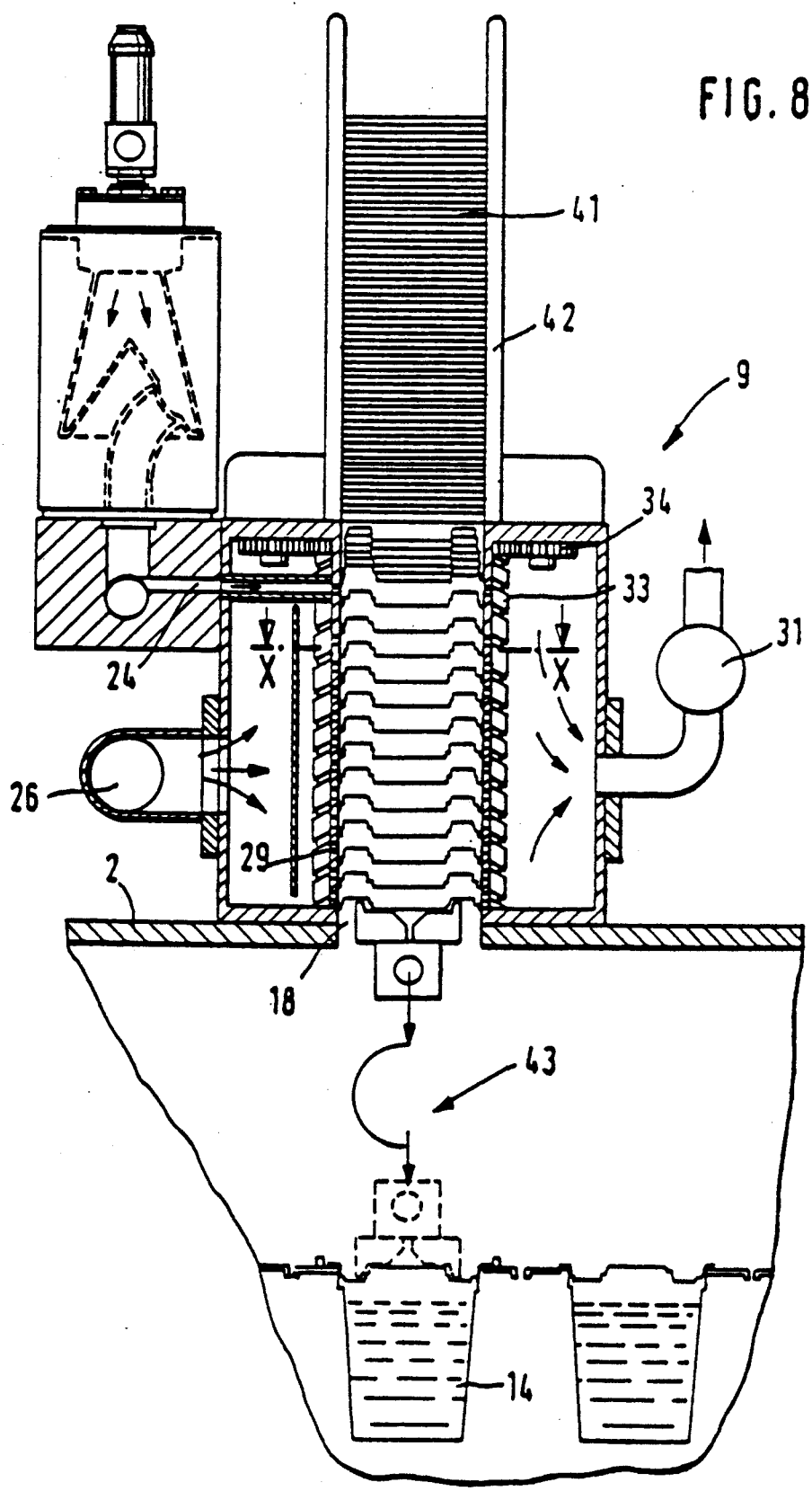
FIG. 8 is a view similar to FIG. 2 showing the sterilizing device for plastic lids and corresponding to a section along the line IX—IX of FIG. 10.
Figure 9:
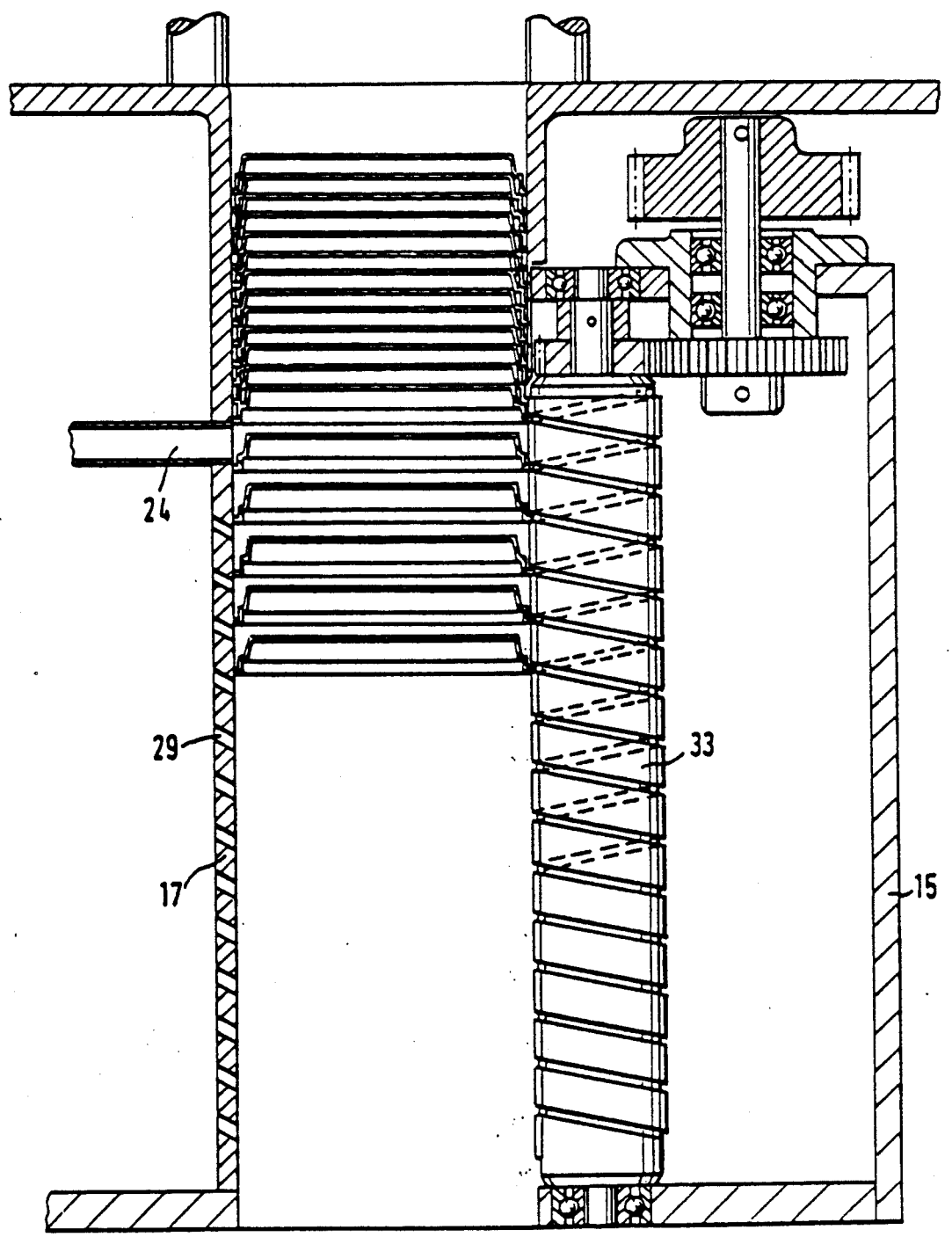
Figure 10:
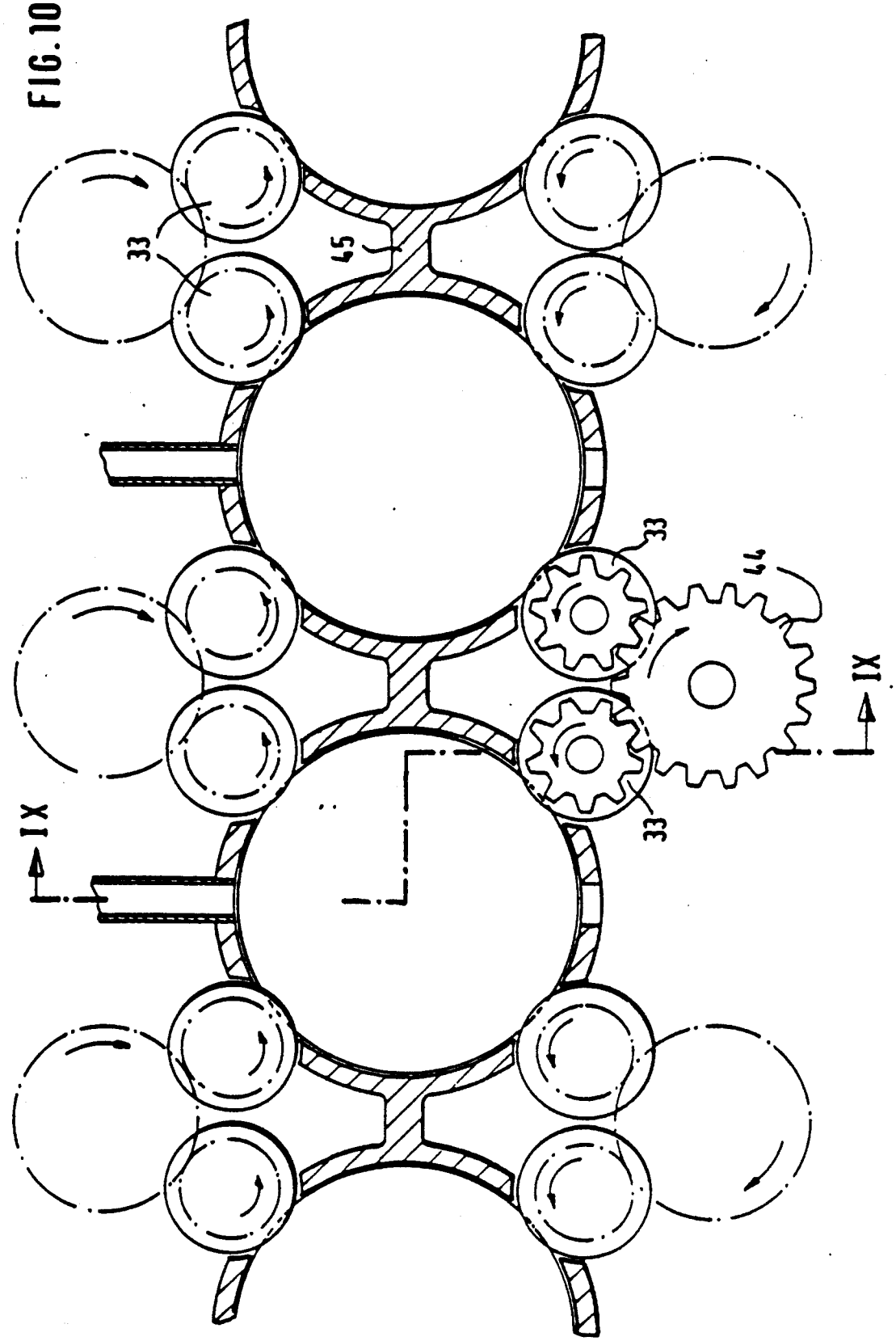
FIG. 10 is a section taken along the line X—X of FIG. 8.
Figure 11:
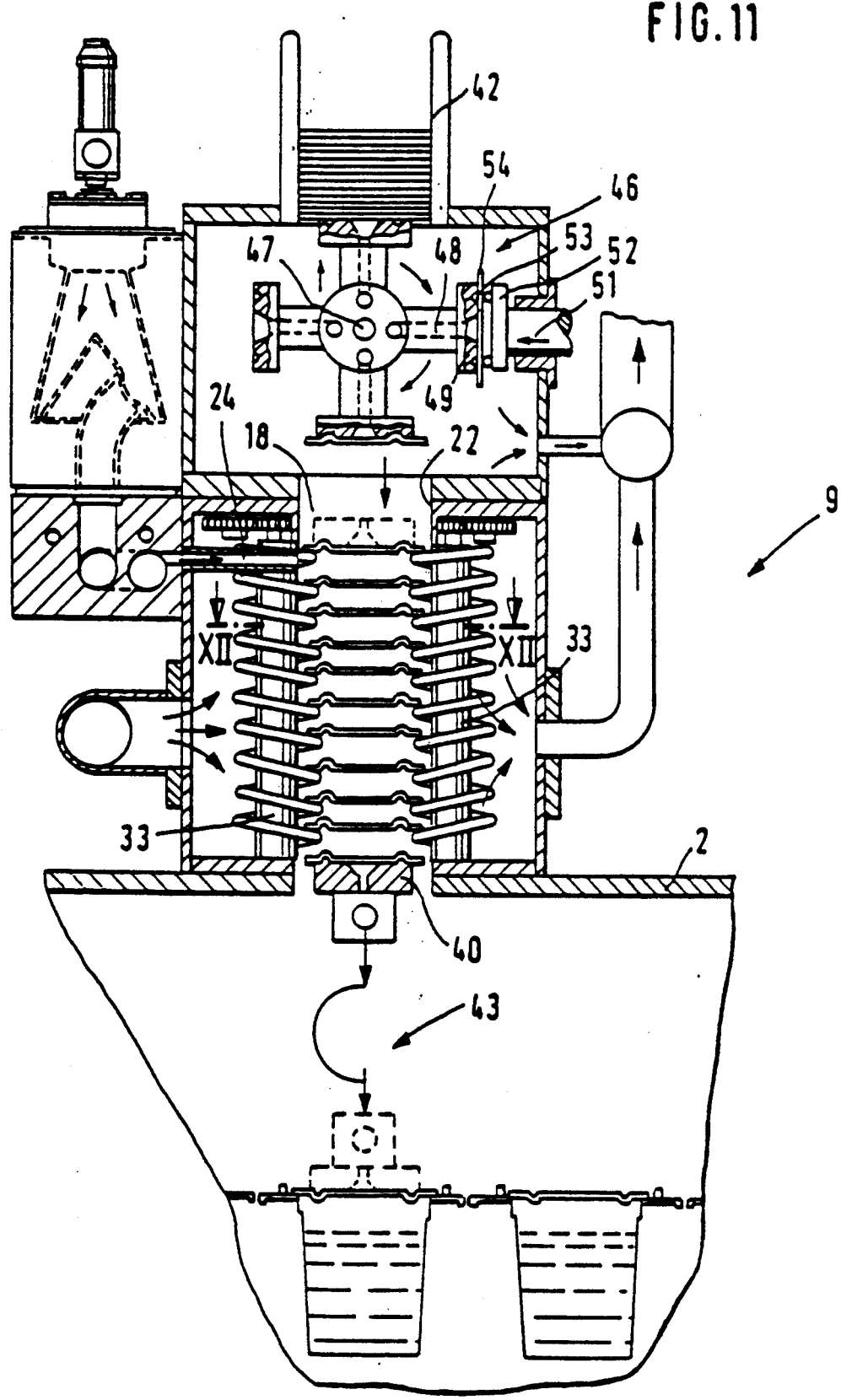
FIG. 11 is a view of the sterilizing device of FIG. 8 but modified to operate with aluminum cover lids.
Figure 12:
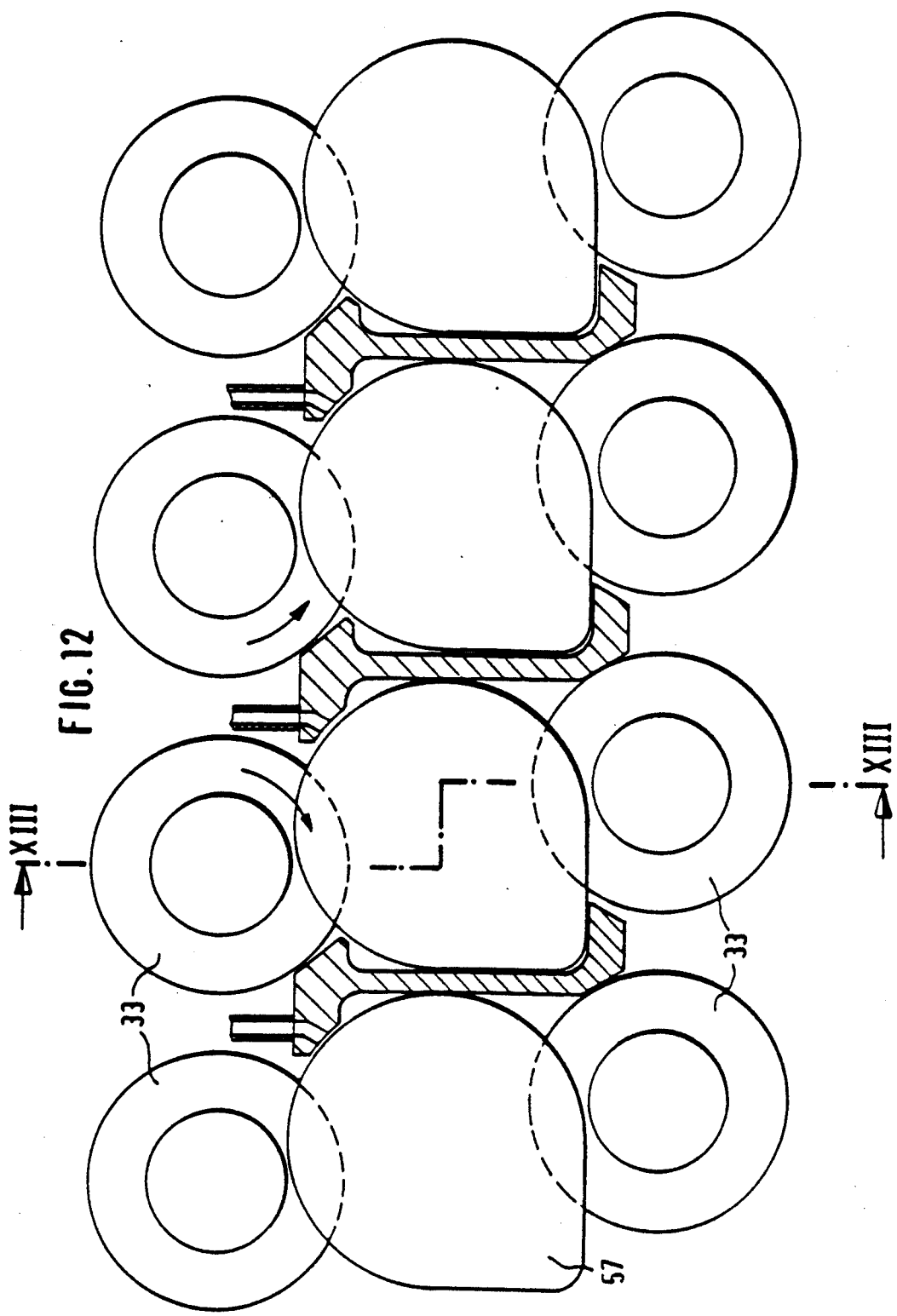
FIG. 12 is a detail section taken along the line XII—XII of FIG. 11 but drawn to a larger scale.
Figure 13:
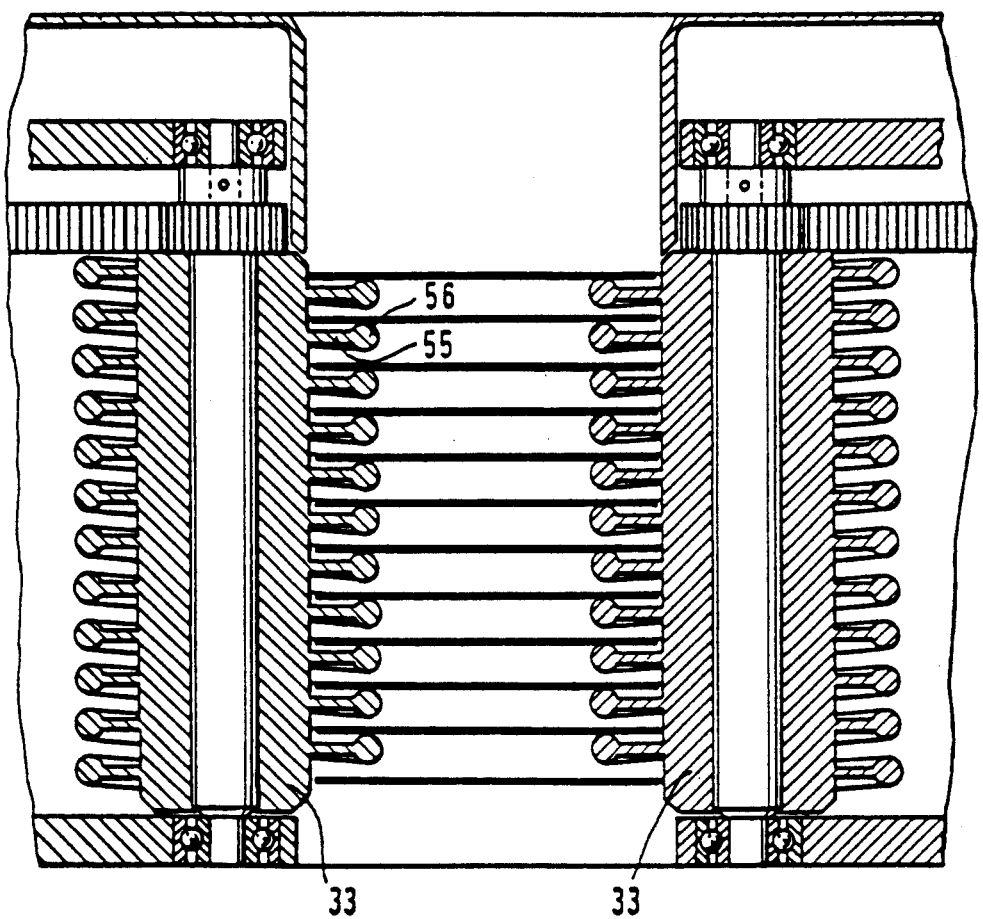
FIG. 13 is a detail section taken along the line XIII—XIII of FIG. 12.

FIGS. 8-10, more specifically, show the sterilization unit for plastic lids while FIGS. 11-13 illustrate a sterilizing unit for aluminum flat lids.

The lid sterilization unit 9 is, in principle, similar to that of the cup sterilization unit, although with the difference that the conveyor screws 33 have a pitch corresponding to the spacing required for the lids.

For the plastic lids 41, a stack magazine 42 is provided in which the profile plastic lids 41 lie directly in contact with one another.

Upon entry of these lids into the sterilizing chamber 18, the plastic lids are rapidly separated to permit the hydrogen peroxide vapor mixture, supplied by the inlet 24, to flush over all surfaces of the plastic lid.

The entry of the sterile air is effected via the throughgoing bores 29. At the lid end of the sterilizing chamber 18, a cover transfer station 43 is schematically shown and serves to remove the lowermost cover from the sterilizing chamber 18, rotate it through 180° and apply it from above onto a cup 14.

FIG. 9 shows the conveyor screw 32 with its drive, here a gear system, which can be driven by a damping belt utilizing the belt drive principles previously discovered. Only one screw has been shown here and the diametrically opposite screw has been omitted for ease of illustration.

As can be seen from FIG. 10, each sterilizing chamber is associated with four conveyor screws provided in two pairs of diametrically opposite screws with the screws of two adjoining sterilizing chambers having a common drive gear.

Whereas in the embodiment of FIG. 4, each screw is common to two sterilizing chambers, in the embodiment of FIG. 10, the conveyor screws are individual to the respective chambers and it is thereby necessary to space the chambers apart, e.g. by connecting them with webs 45.

In FIGS. 11-13 the modification of the invention for embossed flat aluminum lids has been illustrated. In this case, between the stack magazine 42 and the sterilizing chamber, a transfer device 46 is provided with the aid of which the flat lids are withdrawn from the stack magazine and delivered to the sterilizing chamber 18.

The transfer device 46 comprises a horizontal shaft 47 on which a crucifers arrays of arms 48 is provided. The arms 48 are formed with pickup plates 49, adapted to engage and release the lids.

On one side of the transfer device, an embossing stamp 52, movable in the direction of arrows 51 is provided to press corrugations 53 into the aluminum foil lid 54. This embossing step has been found to be effective in increasing the intrinsic stability of the very thin lid, thereby enabling it to be handled more effectively and to be applied to the filled container in a reliable manner.

From FIG. 11 and especially also from FIG. 13, it will be apparent that the thread of the screw 33 is defined by a rib 55 whose outer edge is rounded to be formed with a bead 45. This ensures a point contact of the conveyor screw with the aluminum lids to minimize interference with the sterilization action.

As can also be seen from FIG. 12, the aluminum lids have projecting tongues 57 which enable the user to lift off the lid from the package. Because of this special shape of the lids, the walls defining the sterilizing chambers must also be specially configured. Nevertheless in this embodiment as well the conveyor screws lie diametrically opposite one another.

In various Figures, with the exception of FIG. 5, the pitch of the threads may appear to be uniform over the length. If that is the case, it is only for ease of illustration. In practice in all cases the pitch will be capable of periodically varying the spacing of the cups or covers as is clear from FIG. 5, and, of course, from FIGS. 20 and 21. Also for simplicity of illustration, in FIGS. 4, 10 and 12, the outer walls of the housing of the sterilizing unit have not been illustrated.

Figure 14:
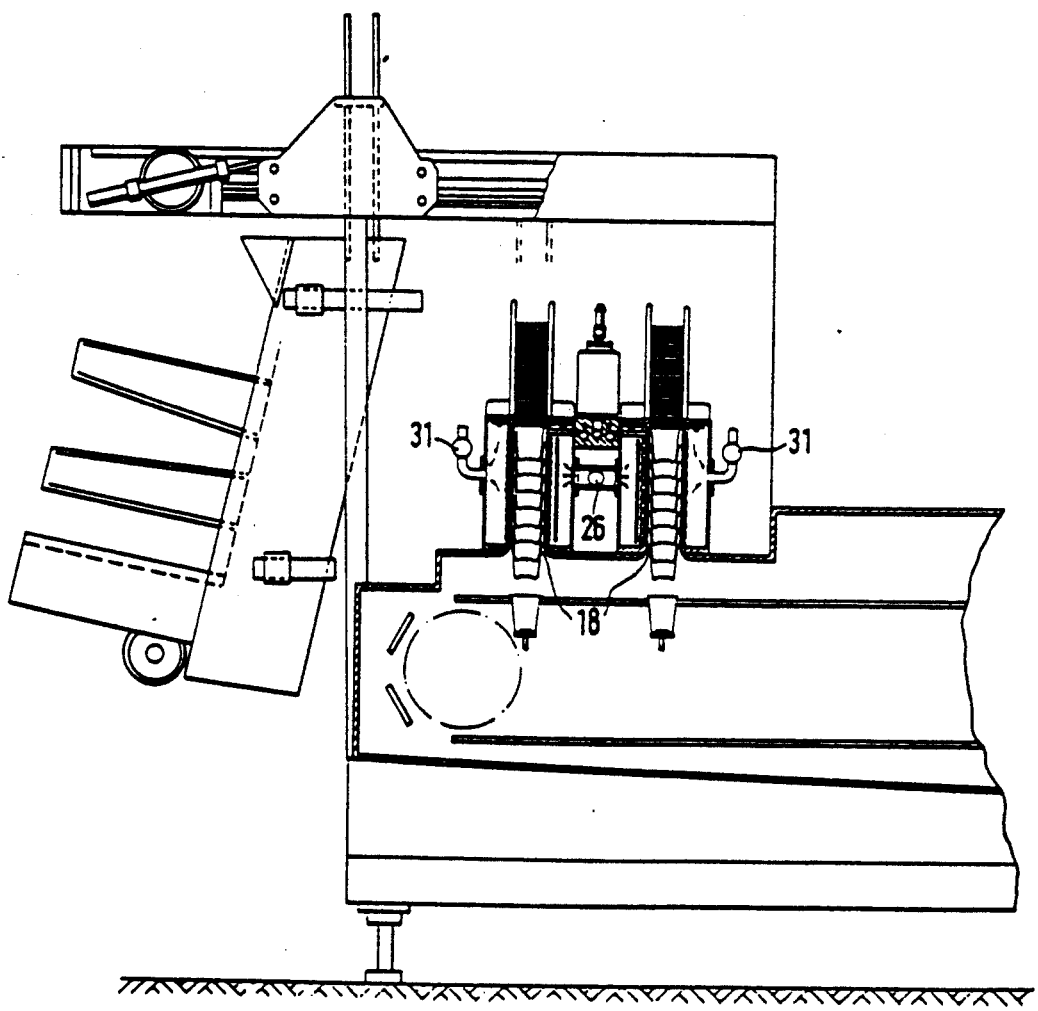
FIG. 14 is a partial sectional view through the machine illustrating two sterilizing chambers in a duplex arrangement according to the invention.

FIG. 14 shows the cups sterilizing unit in a duplex construction. This means that two sterilizing chambers 18 are disposed in tandem, one after the other along the transport path so that the inlet for the hydrogen peroxide vapor mixture and the inlet for the hot air can be located centrally between both sterilizing chambers 18 while the outlets from these sterilizing chambers lie on opposite outer sides.

Figure 15:
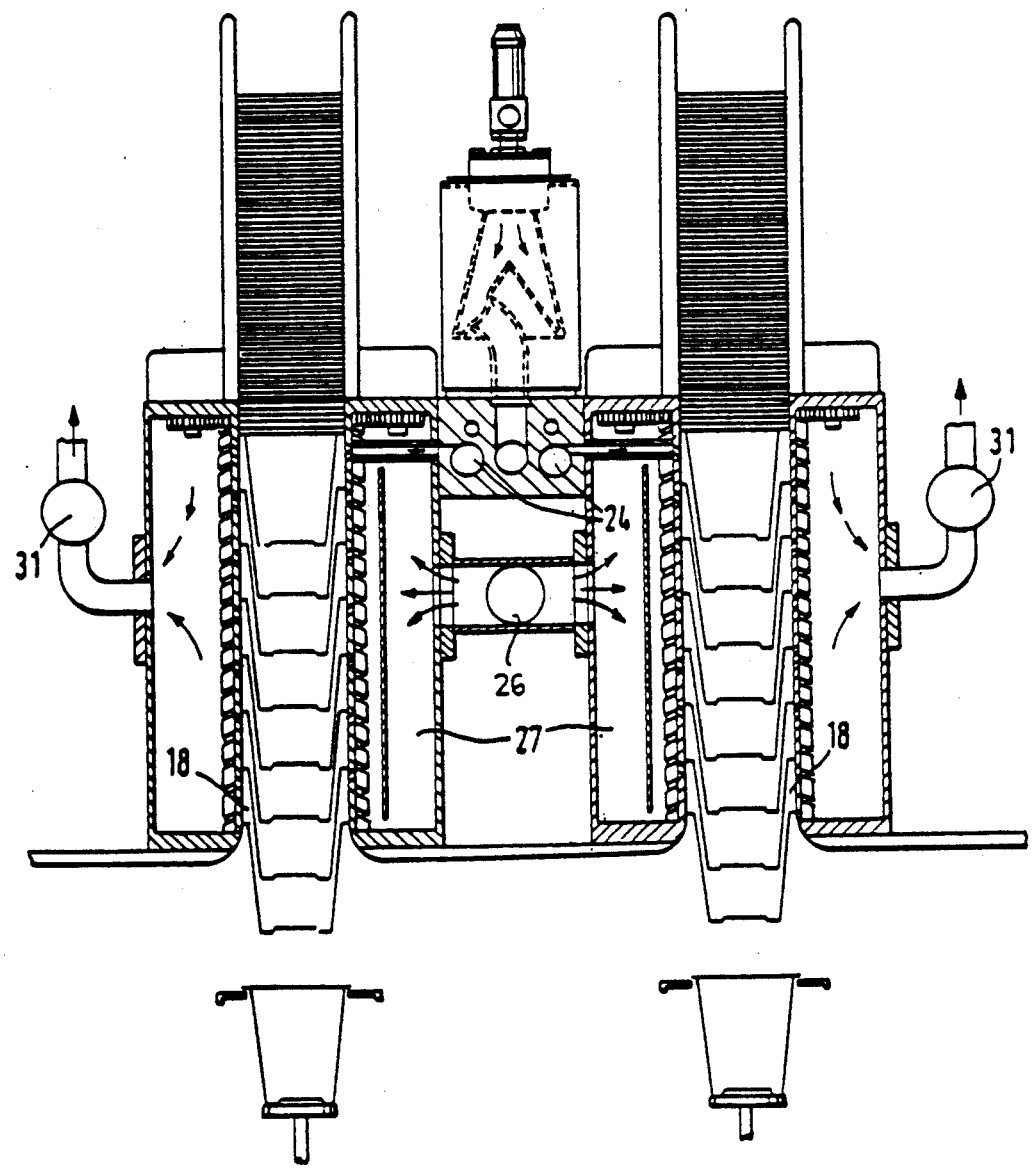
FIG. 15 is a sectional view of a larger scale than FIG. 14 but also illustrating the duplex construction.

Details of the duplexing fluid feed arrangements are shown in FIG. 15. In the illustration of FIG. 15, a single heater and feeder in the hydrogen peroxide mixture communicates with both inlets between the heating chambers and duct 26 and is likewise disposed centrally.

Figure 16:
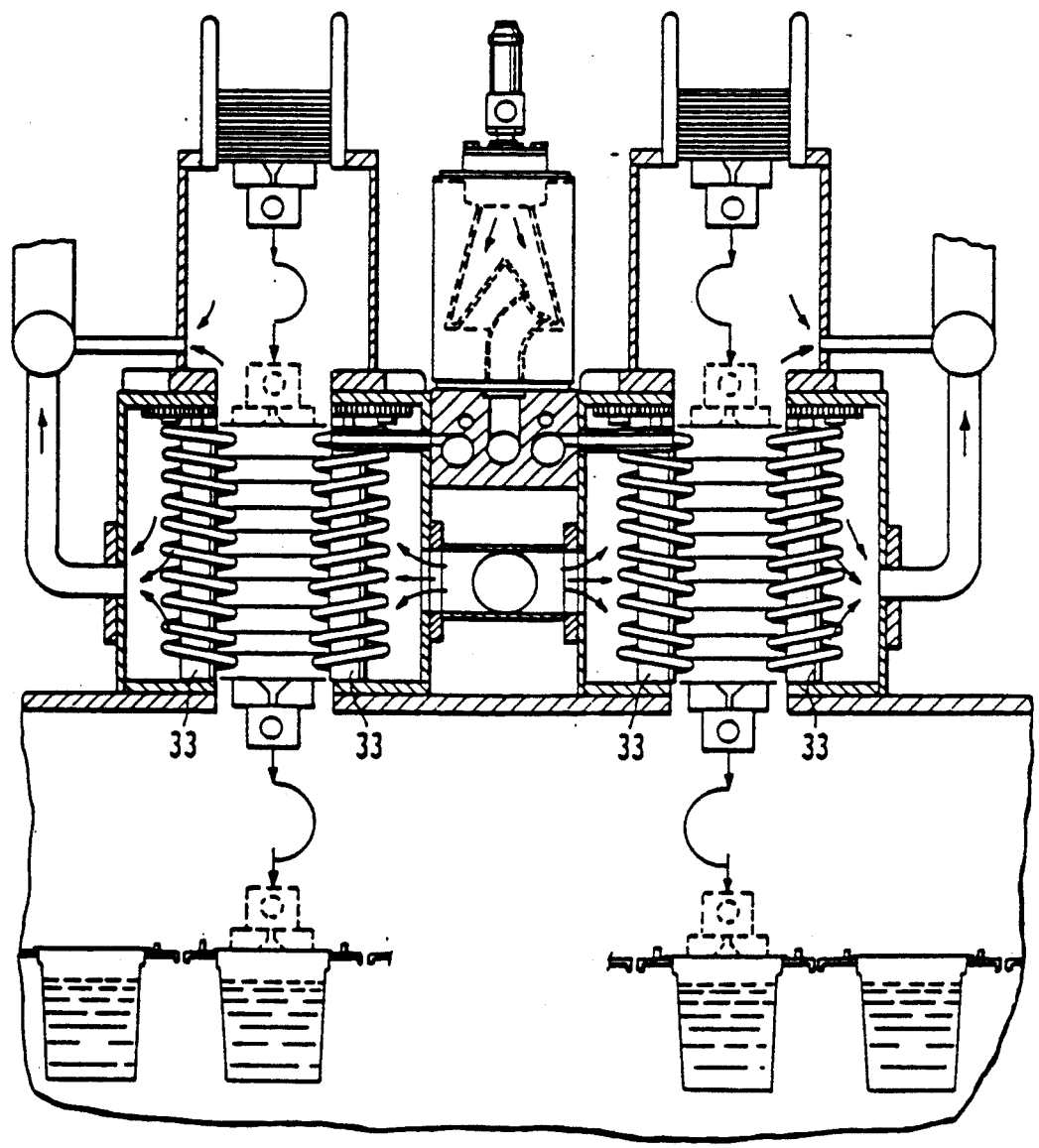
FIG. 16 is a sectional view showing another arrangement according to the invention.

FIG. 16 corresponds to FIG. 15 but illustrates a duplex lid sterilizing arrangement and thus need not be discussed in greater detail.

FIG. 17 is a schematic illustration of a system in which four rows of cups are displaced along the transport path simultaneously in respective tracks and the sterilizing chambers 18 are shown to be provided in two transverse rows of four each. In FIG. 18, the four such rows of sterilizing changers are provided.

The means represented at 100 and 101 in FIGS. 17 and 18 are intended to represent common feeds for both rows of sterilizing chambers with respect to the hydrogen peroxide and hot air in FIG. 17 and to all four rows in FIG. 18.

FIG. 19 shows an arrangement in which the sterilizing chambers are commonly supplied but lie in two staggered rows. Here the feed lines 24 for the hydrogen peroxide may have different lengths.

The packaging and sterilizing machine according to the invention operates in the following manner.

The cups or lids are, via the conveyor screws 33, rapidly displaced within the sterilizing chamber 18 to a predetermined distance from one another and the stack (see the stretch I of FIG. 20) to the predetermined spacing $D_1$, thereby establishing a pressure reduction adjacent the cup or lid serving to suck the hydrogen peroxide vapor mixture onto the surfaces of the packaging element. This ensures that the packaging element will be treated with the hydrogen peroxide vapor on all sides, both inwardly and outwardly, and that all surfaces will be wetted with a condensate film of hydrogen peroxide.

After about three machine cycles, the packaging element is treated with hot sterile air fed through the bores 29 into the sterilizing chamber. The drying step can require about 12 seconds and the hydrogen peroxide containing air can be drawn off from the chamber.

At the lower end of the chamber, the cup and/or aluminum lid can be engaged by a gripper or suction plate 40 of the transfer device 43 and the cups placed on the conveyor and the cover on the filled receptacle, respectively.

By corresponding shaping of the conveyor screws 33 in terms of the variable pitch of the thread, the desired rapid approach and separation of the cups and lid can be achieved to ensure the desired ventilation or pumping action.

In principle, the system operates in the same manner for plastic lids or covers. The plastic lid is displaced by the conveyor screws to a predetermined distance, for example 15 mm from one another so as to be wetted by the hydrogen peroxide vapor, ensuring condensate films on both the inner and outer surfaces of the lid. After about two machine cycles, the plastic lid is treated with hot air at about 75° C. for about 16 seconds The hydrogen peroxide containing air is drawn off by the suction system 31. At the lower end of the respective sterilization chamber, the plastic lids are engaged by the suction element 40 and applied to the filled cups. With this system, plastic lids are efficiently sterilized with hydrogen peroxide.

I claim:

1. A method of sterilizing stacked packaging elements selected from the group of packaging cups and packaging lids, comprising the steps of:
    (a) providing a stack of said packaging elements with successive elements of the stack in mutual contact;
    (b) advancing said elements of said stack in succession through a sterilizing chamber while mutually spacing successive ones of said elements apart;
    (c) contacting the elements of said stack as they are advanced through said sterilizing chamber with a sterilizing fluid which passes around and between said elements and through spaces between said elements as said elements are advanced through said sterilizing chamber;

(d) during advancing of said elements through said sterilizing chamber and while said elements are contacted with said sterilizing fluid, periodically accelerating successive elements apart from one another at least once while said elements are in said chamber; and (e) following acceleration of successive elements apart from one another in step (d), rapidly bringing successive elements toward one another while maintaining said successive elements apart and without contact between them to effect a pumping action on said sterilizing fluid intensifying contact of said fluid with said elements.

2. The method defined in claim 1 wherein the elements of said stack as they are advanced through said sterilizing chamber are contacted with said sterilizing fluid by passing $H_2O_2$ vapor and hot air in succession between and around said elements.

3. The method defined in claim 2 wherein said successive elements are accelerated apart from one another and toward one another in steps (d) and (e) while the hot air is passed between and around said elements.

4. A packaging apparatus comprising:
means for displacing a succession of cup packaging elements along a path;
filling means along said path for introducing a filling substance into said cup elements;
means along said path for applying lid packaging elements to said cup elements for closing said cup elements containing said substance and forming closed packages with said cup elements; and
means along said path for sterilizing at least one of said cup elements and said lid elements, said means for sterilizing including:
a vertically disposed sterilizing chamber disposed along said path and individual to a respective a stack of said packaging elements having successive elements of the respective stack in mutual contact,
means in said chamber for advancing said elements of said stack in succession through said sterilizing chamber while mutually spacing successive ones of said elements apart,
means for contacting the elements of said stack as they are advanced through said sterilizing chamber with a sterilizing fluid which passes around and between said elements and through spaces between said elements as said elements are advanced through said sterilizing chamber, and
means, during advancing of said elements through said sterilizing chamber and while said elements are contacted with said sterilizing fluid, for periodically accelerating successive elements of said stack apart from one another at least once while said elements are in said chamber and, following acceleration of successive elements apart from one another, rapidly bringing successive elements toward one another while maintaining said successive elements apart and without contact between them to effect a pumping action on said sterilizing fluid intensifying contact of said fluid with said elements.

5. The packaging machine defined in claim 4 wherein said means for accelerating includes at least one conveyor screw in said chamber having a thread with a pitch varying along the length of said conveyor screw.

6. The packaging machine defined in claim 5 wherein at least one pair of said conveyor screws is provided in said chamber to engage the elements of said stack, said conveyor screws of said pair lying diametrically opposite one another.

7. The packaging machine defined in claim 6 wherein said screws are provided with a common drive including respective pulleys connected with said screws and a drive belt engaging said pulleys.

8. The packaging machine defined in claim 6 wherein said chamber is formed with an inlet for an $H_2O_2$ vapor mixture proximal to an upper end of said chamber and an inlet for sterile hot air communicating with a distribution chamber communicating with said sterilizing chamber via a plurality of spaced-apart bores distributed substantially over the length of said sterilizing chamber and formed in a wall thereof.

9. The packaging machine defined in claim 8 wherein said bores are inclined downwardly and inwardly toward the interior of said chamber and said elements of said stack are moved downwardly in said chamber.

10. The packaging machine defined in claim 9, further comprising a lid packaging element transfer device upstream of said sterilizing chamber and a lid applicator device for applying said lid elements to said cup elements downstream of said sterilizing chamber.

11. The packaging machine defined in claim 10 wherein said transfer device is provided with an embossing stamp for embossing said lid elements.

12. The packaging machine defined in claim 11 wherein said embossing stamp is disposed on an arm of a rotary crucifers member.

13. The packaging machine defined in claim 9 wherein said threads of said conveyor screws are formed by ribs each of which has the configuration of a rounded bead engageable with the respective elements of the stack.

14. The packaging machine defined in claim 9 wherein said sterilizing chamber is one of a pair of said sterilizing chambers in a duplex construction and the inlet for the $H_2O_2$ vapor mixture and a supply for hot air are located between the two sterilizing chambers.

15. The packaging machine defined in claim 9 wherein a plurality of such sterilizing chambers with respective conveyor screws for treating respective packaging element stacks are provided in a plurality of parallel rows along said path.

16. The packaging machine defined in claim 9 wherein a plurality of parallel packaging element rows are simultaneously sterilized.

17. The packaging machine defined in claim 15 wherein the sterilizing chambers of the parallel rows are offset from one another.

* * * * *